United States Patent
Ou et al.

(10) Patent No.: US 8,082,530 B1
(45) Date of Patent: Dec. 20, 2011

(54) POWER ESTIMATION IN HIGH-LEVEL MODELING SYSTEMS

(75) Inventors: Jingzhao Ou, Sunnyvale, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 374 days.

(21) Appl. No.: 12/389,468

(22) Filed: Feb. 20, 2009

(51) Int. Cl.
   *G06F 9/455* (2006.01)
(52) U.S. Cl. .................................. 716/109; 716/106
(58) Field of Classification Search .............. 716/109
   See application file for complete search history.

(56) References Cited

U.S. PATENT DOCUMENTS

| | | | |
|---|---|---|---|
| 6,026,228 A * | 2/2000 | Imai et al. .................. 716/103 |
| 6,042,613 A * | 3/2000 | Tsukamoto .................. 716/103 |
| 7,110,935 B1 | 9/2006 | Hwang |
| 7,260,809 B2 * | 8/2007 | Ravi et al. .................. 716/104 |
| 7,363,599 B1 * | 4/2008 | Vogenthaler .................. 716/102 |
| 7,493,578 B1 * | 2/2009 | Milne et al. .................. 716/106 |
| 7,580,824 B1 * | 8/2009 | Lewis et al. .................. 703/14 |
| 2004/0123249 A1 * | 6/2004 | Sato et al. .................... 716/1 |
| 2005/0223344 A1 * | 10/2005 | Sato et al. .................... 716/1 |
| 2007/0083831 A1 * | 4/2007 | Hamilton et al. ............. 716/1 |
| 2008/0127001 A1 * | 5/2008 | Tamaki et al. ................ 716/2 |

OTHER PUBLICATIONS

Gilleland, Michael, "Levenshtein Distance, in Three Flavors," printed from www.merriampark.com on Apr. 28, 2008.
Xilinx, Inc., "System Generator for DSP," Mar. 2008, Rel. 10.1, pp. 38-49, available from Xilinx, Inc., 2100 Logic Drive, San Jose, CA 95124.

* cited by examiner

*Primary Examiner* — Paul Dinh
*Assistant Examiner* — Bryce Aiska
(74) *Attorney, Agent, or Firm* — Kevin T. Cuenot; Lois D. Cartier

(57) ABSTRACT

A computer-implemented method of estimating power usage for high-level blocks of a high-level modeling system (HLMS) circuit design can include generating a low-level circuit design from the HLMS circuit design. The method can include simulating the low-level circuit design and storing power usage data, from the simulating, for each of a plurality of circuit elements of the low-level circuit design. The circuit elements can be correlated with the high-level blocks of the HLMS circuit design. A power query of a selected block of the HLMS circuit design can be received and a measure of power usage for the selected high-level block can be determined according to the power usage data for selected ones of the plurality of circuit elements correlated with the selected high-level block. The measure of power usage for the selected high-level block can be output.

20 Claims, 5 Drawing Sheets

POWER ESTIMATION IN HIGH-LEVEL MODELING SYSTEMS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The embodiments disclosed herein relate to integrated circuit devices (ICs). More particularly, the embodiments relate to estimating power usage, within a high-level modeling system, of blocks of a circuit design to be implemented within an IC.

BACKGROUND OF THE INVENTION

A High-Level Modeling System (HLMS) refers to a computer-based circuit design tool that allows circuit designers to graphically create circuits within the HLMS. Typically, an HLMS provides a graphical design environment in which circuit designers can visually create circuits through a drag-and-drop type of design paradigm. Graphical blocks, each representing a particular circuit function, can be dragged into the graphical design environment. For example, each block can represent functions such as multiplexing, addition, multiplication, filtering, or the like. Each of these "high-level" blocks also can be associated with one or more models that may be used to simulate the circuit being developed. Communication among the blocks can be specified by drawing lines, representing signals, that graphically link the blocks placed in the graphical design environment.

Within an HLMS, simulation of a circuit is a high-level analysis that is implemented using a model for each respective block of the circuit. When the circuit is simulated within the HLMS, the models are used without first converting each block of the circuit into a lower-level implementation that specifies actual circuit elements and/or connections among the circuit elements. As a result, information derived through simulation within an HLMS may not be entirely accurate. For example, estimates of power consumption of a system specified within an HLMS will be limited to using power consumption models that exist within the HLMS for each block without regard for the eventual implementation of those blocks within a particular integrated circuit device.

In some cases, a circuit designer may decide to continue with implementation of the circuit from the HLMS implementation into a lower-level implementation. That low-level circuit design can be simulated, thereby generating more accurate simulation data. Unfortunately, the simulation data that is generated, while more accurate, corresponds to the low-level circuit elements that exist within the low-level circuit design, not to the high-level blocks within the HLMS. Any problem with the low-level circuit design that may manifest itself with respect to particular low-level circuit elements may not be traced back to the original block in the HLMS circuit design from which the low-level circuit elements were derived.

SUMMARY OF THE INVENTION

The embodiments disclosed within this specification relate to estimating power usage, within a high-level modeling system (HLMS), of blocks of a circuit design to be implemented within a programmable integrated circuit (IC). One embodiment of the present invention can include a computer-implemented method of estimating power usage for high-level blocks of an HLMS circuit design. The method can include generating a low-level circuit design including a plurality of low-level circuit elements from the HLMS circuit design and simulating the low-level circuit design. Power usage data, from the simulating, can be stored for each of the plurality of low-level circuit elements. The plurality of low-level circuit elements can be automatically correlated with high-level blocks of the HLMS circuit design. A query for power usage of a selected high-level block of the HLMS circuit design can be received. The method can include determining a measure of power usage for the selected high-level block according to the power usage data for selected ones of the plurality of low-level circuit elements correlated with the selected high-level block. The measure of power usage for the selected high-level block can be output.

In one aspect, the computer-implemented method can include selecting the low-level circuit design to be a hardware description language (HDL) circuit design and selecting each of the plurality of low-level circuit elements to be an HDL circuit element. Generating a low-level circuit design can include generating the HDL circuit design from the HLMS circuit design. The method also can include generating and storing name translation data mapping the plurality of HDL circuit elements to the high-level blocks of the HLMS circuit design. Automatically correlating the plurality of low-level circuit elements with the high-level blocks can include associating each of the plurality of low-level circuit elements with one of the high-level blocks according to the name translation data.

In another aspect, the computer-implemented method can include selecting the low-level circuit design to be a netlist and selecting each of the plurality of low-level circuit elements to be a netlist circuit element. Generating a low-level circuit design can include generating an HDL circuit design from the HLMS circuit design, wherein the HDL circuit design includes a plurality of HDL circuit elements, and generating and storing name translation data mapping the plurality of HDL circuit elements to the high-level blocks of the HLMS circuit design. The netlist can be generated from the HDL circuit design.

Automatically correlating the plurality of low-level circuit elements with high-level blocks can include mapping netlist circuit elements to HDL circuit elements according to a selected match approximation technique and associating HDL circuit elements with the high-level blocks according to the name translation data. Mapping netlist circuit elements according to a selected match approximation technique can include, for each HDL circuit element, calculating a distance metric between a name of the HDL circuit element and a name of each of the plurality of netlist circuit elements and mapping each netlist circuit element to the HDL circuit element with a smallest distance metric.

Automatically correlating the plurality of low-level circuit elements with the high-level blocks also can include determining a component type for each of a plurality of netlist circuit elements of the netlist and determining a circuit structure to which the plurality of netlist circuit elements map that is available within a programmable IC in which the HLMS circuit design is to be implemented. Each of the plurality of netlist circuit elements can be mapped to one of the high-level blocks of the HLMS circuit design that represents the circuit structure available within the programmable IC.

The computer-implemented method further can include receiving the query for power usage of the selected high-level block of the HLMS circuit design through an application programming interface, provided as part of an HLMS, that returns the measure of power usage for the selected high-level block of the HLMS circuit design, as calculated from the power usage data for each of the plurality of low-level circuit elements.

Another embodiment of the present invention can include a computer-implemented method of estimating power usage for high-level blocks of an HLMS circuit design. The computer-implemented method can include generating a low-level circuit design including a plurality of low-level circuit elements from the HLMS circuit design, simulating the low-level circuit design and storing power usage data, from the simulating, for each of the plurality of low-level circuit elements, and automatically correlating the plurality of low-level circuit elements with the high-level blocks of the HLMS circuit design. High-level power usage data for at least one of the high-level blocks of the HLMS circuit design, as calculated from power usage data for selected ones of the plurality of low-level circuit elements correlated with the at least one of the high-level blocks, can be output.

In one aspect, the computer-implemented method can include selecting the low-level circuit design to be an HDL circuit design and selecting each of the plurality of low-level circuit elements to be an HDL circuit element. Generating a low-level circuit design can include generating the HDL circuit design from the HLMS circuit design. The method further can include generating and storing name translation data mapping the plurality of HDL circuit elements to high-level blocks of the HLMS circuit design. Accordingly, automatically correlating the plurality of low-level circuit elements can include assigning each of the plurality of low-level circuit elements to one of the high-level blocks according to the name translation data.

In another aspect, the computer-implemented method can include selecting the low-level circuit design to be a netlist and selecting each of the plurality of low-level circuit elements to be a netlist circuit element. Generating a low-level circuit design can include generating an HDL circuit design from the HLMS circuit design, wherein the HDL circuit design includes a plurality of HDL circuit elements, generating and storing name translation data mapping the plurality of HDL circuit elements to the high-level blocks of the HLMS circuit design, and generating a netlist from the HDL circuit design.

Automatically correlating each of the plurality of low-level circuit elements can include mapping netlist circuit elements to HDL circuit elements according to a selected match approximation technique and mapping HDL circuit elements to the high-level blocks according to the name translation data.

Responsive to receiving a user query for power usage of a selected high-level block of the HLMS circuit design, a measure of power usage for the selected high-level block, as calculated from the power usage data for selected ones of the low-level circuit elements correlated with the selected high-level block, can be output.

Yet another embodiment of the present invention can include a computer program product including a computer-usable medium having computer-usable program code that, when executed by a data processing system, such as a computer, causes the data processing system to perform the various steps and/or functions disclosed herein.

DETAILED DESCRIPTION

Figure 1:
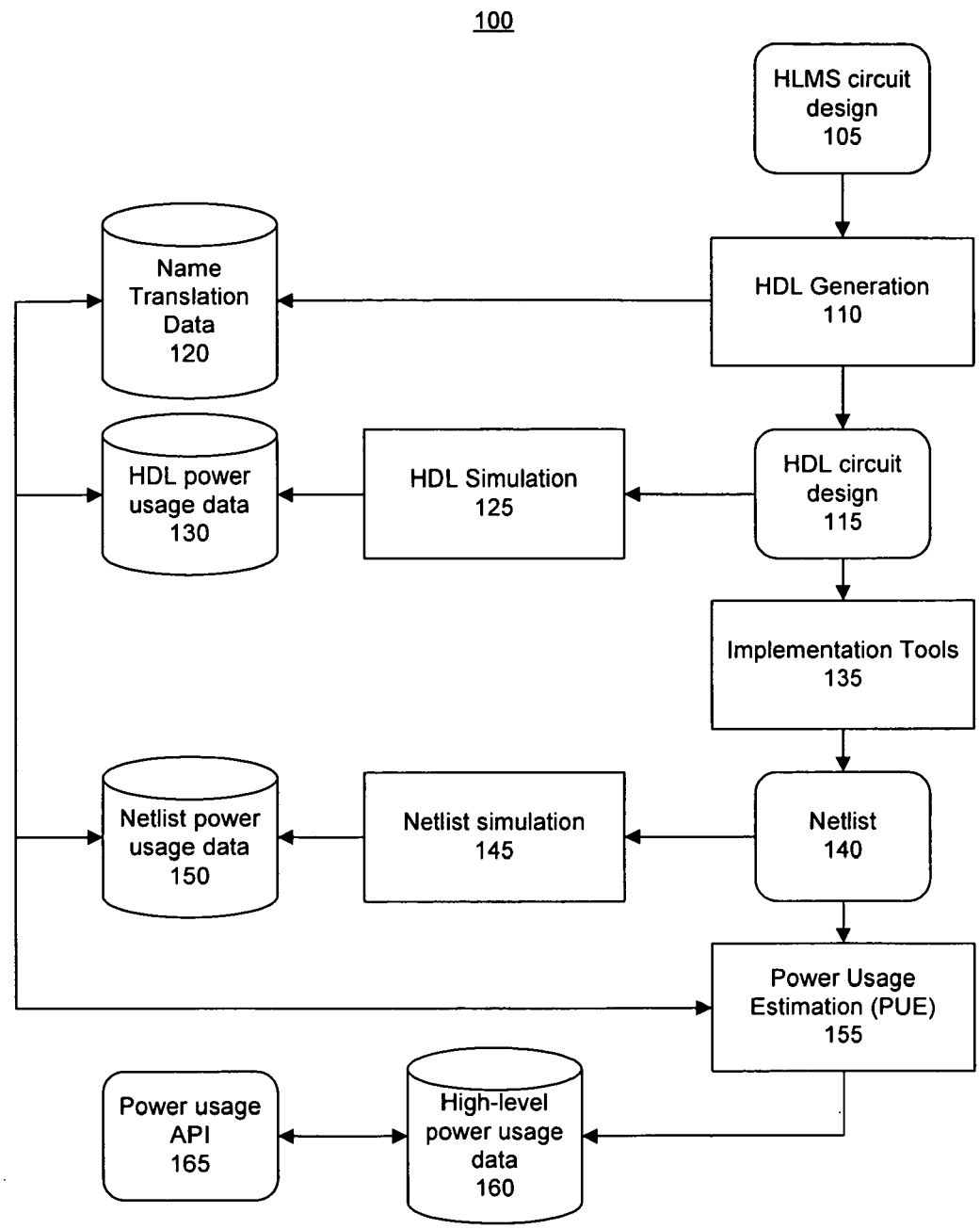
FIG. 1 is a first block diagram illustrating a technique for estimating power usage of high-level blocks of a circuit design within a High-Level Modeling System (HLMS) in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely examples of possible implementations of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed within this specification relate to estimating power usage of a circuit implemented within a High-Level Modeling System (HLMS). In accordance with the embodiments disclosed herein, a circuit design created or specified within an HLMS can be processed to generate a low-level circuit design. That low-level circuit design can be simulated and power usage analysis can be performed. Power usage data generated through the simulation can be automatically correlated with the high-level blocks that specify the circuit design within the HLMS. This allows a user of the HLMS to conduct more detailed and accurate power usage analysis through simulation of a low-level circuit design. The user retains the ability to attribute the power usage data calculated for low-level circuit elements of the low-level circuit design to the high-level blocks used to specify the circuit design within the HLMS.

Within a conventional HLMS, users have been restricted to performing high-level power usage analysis using the models provided by the HLMS. These models lack the detail that is achieved through generating low-level representations of each high-level block, as is performed when processing the circuit design for implementation within a target programmable integrated circuit (IC). Within a conventional HLMS, when more detailed power usage data is desired, the user invokes various implementation tools to generate lower-level representations of the circuit design. Simulations could then be performed upon the lower-level representations to derive power usage data. The power usage data is typically output from such tools in the form of a text report. Often, however, it is difficult to determine the relationship between the low-level circuit elements that are listed in the power usage report and the high-level blocks used to specify the circuit design within the HLMS.

The embodiments disclosed within this specification facilitate the automated correlation of power usage data, determined from a low-level representation of the circuit design, to high-level blocks within the HLMS. The power usage data can be correlated with the high-level blocks of the circuit as specified within the HLMS. This allows a circuit designer to obtain detailed and accurate power usage data for particular high-level blocks of the HLMS. The embodiments of the present invention also provide an application programming interface (API) through which users may query for power usage of particular high-level blocks of the HLMS.

The embodiments disclosed within this specification can be applied to circuits specified within an HLMS that are to be implemented within a programmable IC. Programmable ICs are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable ICs is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

FIG. 1 is a first block diagram illustrating a technique for estimating power usage of high-level blocks of a circuit design within an HLMS in accordance with one embodiment of the present invention. FIG. 1 illustrates various processing steps that can be performed by an HLMS 100. HLMS 100, as described within this specification, can be implemented in the form of a computer executing computer-usable program code.

A computer suitable for storing and/or executing computer-usable program code will include at least one processor coupled directly or indirectly to memory elements through a system bus. The memory elements can include local memory employed during actual execution of the program code, bulk storage, and cache memories which provide temporary storage of at least some computer-usable program code in order to reduce the number of times computer-usable program code must be retrieved from bulk storage during execution.

Input/output (I/O) devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

One example of an HLMS is the Xilinx System Generator for Digital Signal Processing (DSP), also known as "Sysgen." Simulink, which runs in Matlab from The Math Works, Inc., of Natick, Mass., is an interactive tool for modeling, simulating, and analyzing dynamical systems. SysGen is a high-performance design tool that executes as part of Simulink to provide a high-level, graphical modeling environment.

As shown, an HLMS circuit design 105 can be specified or loaded into an HLMS 100. HLMS circuit design 105 can be a high-level representation of a circuit design that can be, for example, specified in the native format used by HLMS 100. As such, HLMS circuit design 105 will specify one or more high-level, functional, blocks (blocks) connected by graphic lines representing signals exchanged among the blocks.

HLMS 100 can automatically translate HLMS circuit design 105 into a hardware description language (HDL) circuit design 115 through an HDL generation process illustrated as HDL generation block 110. HDL generation block 110 outputs an HDL circuit design 115. As used herein, "outputting" and/or "output" can mean, for example, writing to a file, writing to a user display or other output device, storing in memory, playing audible notifications, sending or transmitting to another system, exporting, or the like.

HLD circuit design 115 can be a programmatic description of the circuit design specified in an HDL such as Verilog or VHDL. That is, HDL circuit design 115 will be an HDL representation of HLMS circuit design 105. HDL circuit design 115 can be considered a low-level representation of HLMS circuit design 105. As such, HDL circuit design 115 will include a plurality of HDL circuit elements. Each of the blocks of HLMS circuit design 105 will be implemented as, or translated into, one or more HDL circuit elements within HDL circuit design 115.

In translating HLMS circuit design 105 into HDL circuit design 115, HDL generation block 110 can perform various processing functions including, but not limited to, name translation to avoid naming conflicts in HDL circuit design 115. In general, the names used to represent blocks and lines within HLMS circuit design 105 will be different from the names used to represent HDL circuit elements. Such is the case as each respective programmatic format, in general, will have different naming rules and/or a different naming syntax that must be observed.

When generating HDL circuit design 115, HDL generation block 110 will apply different name modification techniques to change names, as necessary, from those specified in HLMS circuit design 105 to an acceptable format or syntax for use within HDL circuit design 115. In addition to conforming to an accepted naming syntax, this processing also avoids naming conflicts within HDL circuit design 115. Name changes can be applied to the HDL circuit elements that, in various combinations, represent blocks of HLMS circuit design 105. For example, HDL generation block 110 can apply name changes to low-level entities and/or modules of HDL circuit design 115 that represent blocks within HLMS circuit design 105. In another example, HDL generation block 110 can apply name changes to low-level signal names within HDL circuit design 115 that represent lines within HLMS circuit design 105.

HDL generation block 110 can create and/or store a record of the different name changes that are applied when generating HDL circuit design 115 from HLMS circuit design within name translation data 120 in memory, e.g., as one or more name translation files. Name translation data 120 can specify a one-to-one mapping of the blocks of HLMS circuit design 105 to HDL circuit elements, such as entities and/or modules, of HDL circuit design 115. Name translation data 120 also can specify a one-to-one mapping of lines specified within HLMS circuit design 105 to HDL circuit elements such as low-level signals and/or wires within HDL circuit design 115. In this manner, each HDL circuit element will be mapped to at least one block of HLMS circuit design 105 by name translation data 120.

FIG. 1 illustrates that simulation may be performed upon a circuit design at any of a variety of different implementation stages. For example, HLMS 100 can automatically generate an HDL testbench within which HDL circuit design 115 can be simulated, as represented in HDL simulation block 125. Simulation results generated by simulation block 125 can be stored as HDL power usage data 130 in memory. HDL power usage data 130 can specify power usage on a per HDL circuit element basis, as derived or calculated from, simulation of HDL circuit design 115 by HDL simulation block 125.

HLMS 100 can include a power usage estimation (PUE) block 155. PUE block 155 can correlate low-level power usage data such as HDL power usage data 130 and netlist power usage data 150, to be described herein, back to, or with, blocks of HLMS circuit design 105. The correlation of HDL power usage data 130 to blocks can be performed using name translation data 120. In other words, PUE block 155 can attribute the power usage for each HDL circuit element, as specified within HDL power usage data 130, to the block of HLMS circuit design 105 to which each respective HDL circuit element is mapped according to the name translation data 120.

After generating HDL circuit design 115, HLMS 100 can apply one or more implementation tools 135 to HDL circuit design 115 to generate, and output, a netlist 140. Implementation tools 135 can perform functions such as synthesis, mapping, placing, and routing. Implementation tools 135 may be included as part of HLMS 100 or may be provided by a manufacturer other than the manufacturer of HLMS 100. In either case, implementation tools 135 may be invoked automatically through HLMS 100.

The term "synthesis," in general, refers the process of converting an HDL description of a circuit design, e.g., HDL circuit design 115, into a gate level description of the circuit design. In this sense, the circuit design is "compiled" using a logic synthesis tool into an implementation of low level logic gates referred to as a netlist. "Mapping," in general, refers to the process of identifying constructs of the logical netlist, e.g., primitive logic gates, and associating those logic primitives with the actual physical resources of the target programmable IC within which the netlist will be implemented. For example, one or more individual logic gates may be mapped to look-up tables (LUTs), latches, flip-flops, block random access memories (BRAMs), or the like. Mapping adds "map" data to the netlist.

"Placing," in general, refers to the process of assigning the circuit elements, to which logic primitives of the synthesized circuit design have been mapped, to actual locations of the target device. The assignment information can be added to the netlist. For example, once logic gates are assigned to LUTs for implementation, combinations of logic gates can be assigned to a particular LUT on the target device, where that LUT has a particular, physical location on the target device. "Routing," in general, refers to the process of programming the interconnect circuitry to establish the necessary signaling links among the various circuit elements of the target device. Routing information also can be added to the netlist that is generated by the implementation tools.

When HDL circuit design 115 is processed by implementation tools 135 to generate netlist 140, implementation tools 135 will modify names of HDL circuit elements. The name transformations can avoid naming conflicts and reconcile differences in naming rules and/or naming syntax. Unlike the transformation of HLMS circuit design 105 to HDL circuit design 115, name translation data is not available for the conversion of HDL circuit design 115 to netlist 140.

As noted, name changes arise when generating netlist 140 for a variety of reasons. In one example, name changes arise in consequence of "flattening" HDL circuit design 115 into netlist 140. That is, HDL circuit design 115 can be hierarchical, permitting multiple instances of a single element, whereas netlist 140 is not hierarchical, thereby requiring name changes to avoid conflicts. In another example, implementation tools 135 may eliminate components and/or wires found in HDL circuit design 115, combine components and/or wires found within HDL circuit design 115, or create components and/or wires during implementation to be included within netlist 140 that were not explicitly specified in HDL circuit design 115. For example, given a constraint that places a limitation on the maximum fanout of a device, implementation tools 135 may duplicate one or more components and/or wires to obey the fanout constraint and/or to optimize performance of the resulting circuit.

In any case, predicting the name changes performed by implementation tools 135 is not practical. Moreover, when third party implementation tools are used, a record of the name changes performed by the implementation tools is simply not available to HLMS 100.

As pictured in FIG. 1, netlist 140 can be provided to netlist simulation block 145. Netlist simulation block 145 can simulate netlist 140 and, through that simulation, generate and output netlist power usage data 150. In order to generate power usage data 150 from a simulation of netlist 140, which may be a post place and route netlist, a value change dump (VCD) file that specifies waveforms for all signals of netlist 140 and how those signals transition during operation of the circuit specified by netlist 140 is needed. The VCD file further can provide the necessary timing information indicating when each of the signals transitions. HLMS 100 can automatically generate the VCD file as part of the processing functions offered.

Netlist power usage data 150 can specify power usage on a per netlist element basis. That is, the amount of power used by a given netlist element, e.g., a particular wire or circuit component, can be determined from performing a simulation of netlist 140 using information provided within the VCD file.

In order to correlate netlist power usage data 150 to blocks of HLMS circuit design 105, PUE block 155 must correlate power usage of individual netlist circuit elements to HDL circuit elements, and then correlate HDL circuit elements to blocks of HLMS 105. Given the lack of name translation data available for netlist 140, PUE block 155 must estimate the particular HDL circuit element with which each netlist circuit element is related, or from which each netlist circuit element is derived. One or more match approximation techniques can be used to perform this function.

In one embodiment, the match approximation technique can involve determining a measure of distance between two strings. Using such a match approximation technique, PUE block 155 can compare names of netlist circuit elements with names of HDL circuit elements. PUE block 155 can determine that a pair of circuit elements including a netlist circuit element and an HDL circuit element having a lowest measure of distance will be related. That is, the netlist circuit element will have been derived from the HDL circuit element.

One example of a technique for determining distance between two strings is called the "Levenshtein distance" or "LD." LD is a measure of the similarity between two strings, which can be referred to as the source string (s), e.g., the name of an HDL circuit element, and the target string (t), e.g., the name of a netlist circuit element. The LD is the number of deletions, insertions, or substitutions required to transform string s into string t. For example, if string s is "test" and string t is also "test", the LD is zero because no transformations are needed. The strings are already identical. If string s is "test" and string t is "tent", the LD is one because one substitution, e.g., a change of letter "s" to letter "n," will transform string s into string t. In general, the greater the LD for a given pair of strings, the more different the strings are.

In another embodiment, PUE block 155 can perform an analysis of netlist circuit element names to identify different netlist circuit elements that share a particular formative. For example, consider the case where a plurality of netlist circuit elements have names that have been completely changed from that specified in HDL circuit design 115. It may be the case that each name of one of the plurality of netlist circuit elements includes the formative "s123." In that case, PUE block 155 can perform an analysis of each type of netlist circuit element having the formative "s123" in its name and determine the type of component represented by that netlist circuit element. PUE block 155 then can evaluate the types of circuit structures that are available within the target programmable IC within which netlist 140 is to be implemented. If a circuit structure, e.g., an adder, a BRAM, a DSP, or the like, is found to which that the set of netlist circuit elements would be matched, PUE block 155 can determine that the set of netlist circuit elements with the common formative defines that circuit structure. The identified circuit structure then can be compared with blocks of HLMS circuit design 105 to determine whether HLMS circuit design 105 includes a block representing the identified circuit structure. If so, the netlist circuit elements, and the power usage of each such netlist circuit element, can be attributed to the identified block.

Other examples of approximation techniques can include string matching techniques in those cases where names are not completely changed when generating netlist 140 from HDL circuit design 115. String matching can be used, for example, when circuit element names are changed by appending data, leaving the original name largely intact. The examples provided within this specification are intended for purposes of illustration only. As such, the examples are not intended to limit the embodiments to any one particular match approximation technique.

PUE block 155 can evaluate the different sets of power usage data generated, e.g., HDL power usage data 130 and netlist power usage data 150, and correlate each set of data power usage data back to different ones of the blocks of HLMS circuit design 105. PUE block 155 can generate and output high-level power usage data 160, which can specify the power usage of high-level blocks of HLMS circuit design 105 as calculated using the low-level power usage data of HDL power usage data 130 and/or netlist power usage data 150.

In one embodiment, PUE block 155 can begin automatically correlating data as low-level power usage data becomes available through different simulations. In another embodiment, the correlation of low-level power usage data with blocks can be performed responsive to a user query for power usage of a selected block of HLMS circuit design 105.

HLMS 100 further can include a power usage API 165. Through power usage API 165, a user may directly query HLMS 100 for the power usage of any of the blocks specified within HLMS circuit design 105. The power usage data returned for a given block through power usage API 165 will be derived from the low-level power usage data described as correlated with the particular block that is the subject of the user-specified query.

It should be appreciated that the various functions such as generating HDL circuit design 115, simulating HDL circuit design 115, deriving HDL power usage data 130 for circuit design 115, generating netlist 140, simulating netlist 140, generating netlist power usage data 150, and correlating power usage data, whether HDL power user data 130 and/or netlist power usage data 150, using the PUE block 155 can be performed automatically and completely from within the design environment provided by HLMS 100.

Figure 2:
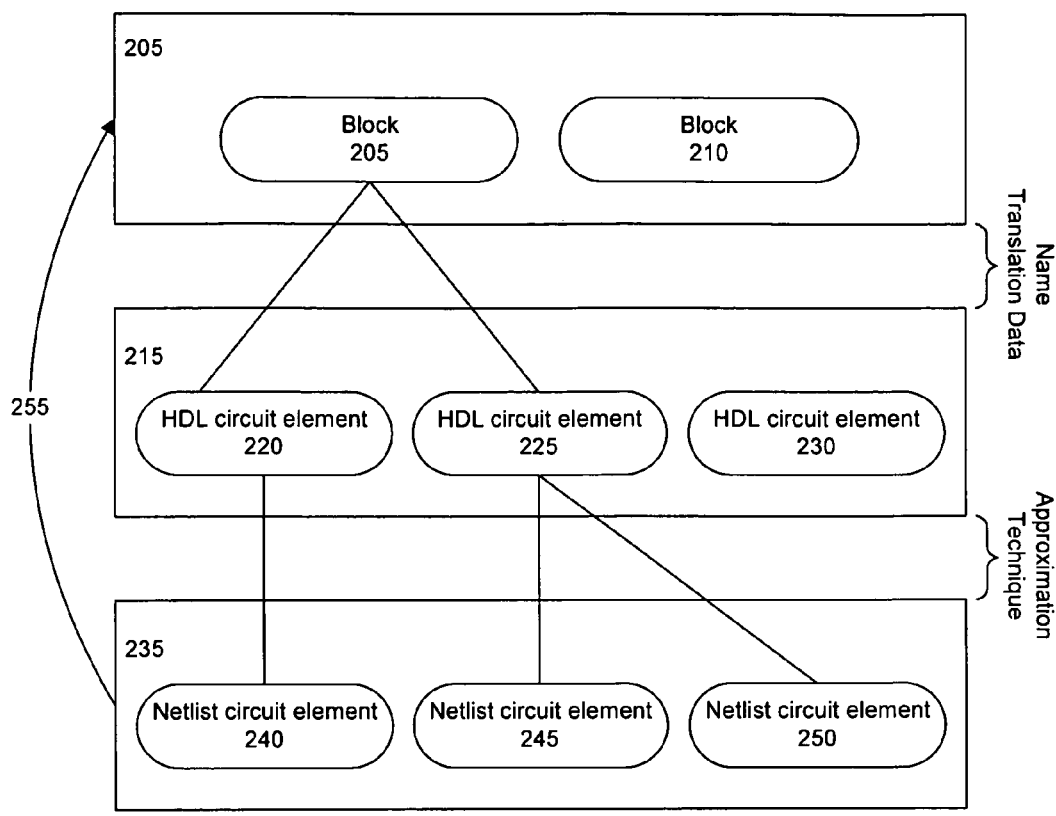
FIG. 2 is a second block diagram illustrating a technique for correlating low-level circuit elements with blocks of an HLMS circuit design in accordance with another embodiment of the present invention.

FIG. 2 is a second block diagram illustrating a technique for correlating low-level circuit elements with blocks of an HLMS circuit design in accordance with another embodiment of the present invention. FIG. 2 illustrates the different levels of processing that must be applied to determine those circuit elements at the netlist level and/or those circuit elements at the HDL level that correspond to a particular block within an HLMS circuit design. FIG. 2 illustrates an HLMS circuit design 205 that includes two blocks 210 and 215. HLMS circuit design 205 has been transformed into an HDL circuit design 215 that includes HDL circuit elements 220, 225, and 230. HDL circuit design 215 has been transformed into a netlist 235. Netlist 235 can include netlist circuit elements 240, 245, and 250.

As shown, the PUE of the HMLS can, using name translation data, determine that HDL circuit elements 220 and 225 were derived from block 205. Accordingly, the PUE can map, or assign, HDL circuit elements 220 and 225 to block 205. In this regard, as HDL circuit elements 220 and 225 are correlated with block 205, any power usage determined for HDL circuit elements 220 and 225 within an HDL testbench, for example, can be attributed to block 205. More particularly, power usage of HDL circuit element 220 and HDL circuit element 225 can be summed to provide a measure of power usage for block 205.

In the case where HLMS circuit design 205 has been transformed into netlist 235, using match approximation techniques as described, the PUE can determine that netlist circuit element 240 is derived from HDL circuit element 220. Similarly, the PUE can determine that netlist circuit elements 245 and 250 are derived from HDL circuit element 225. Accordingly, the PUE can assign, or map, netlist circuit element 240 to HDL circuit element 220. The PUE can assign, or map, netlist circuit elements 245 and 250 to HDL circuit element 225. By correlating netlist circuit elements 240-250 with block 205, any power usage determined for netlist elements 240-250 may be attributed to block 205. That is, the power usage of netlist circuit elements 240-250 can be summed to provide a measure of power usage of block 205.

Arc 255 represents the match approximation technique described where the PUE can determine the type of each of netlist circuit elements 240-250 and determine that the set of netlist circuit elements 240-250 can be mapped to a particular type of circuit structure, such as a DSP, within the target programmable IC. Further analysis by the PUE can determine that block 205 in HLMS circuit design 205 represents a DSP. Accordingly, the PUE can infer a relationship and correlate netlist circuit elements 240-250 with block 205 in this manner.

When reporting power consumption of a block within the HLMS, in general, the power consumed by clocks sources, clock buffers, and clock nets will not be included in the power usage data provided. Typically, the data available is not sufficient to attribute portions of clock networks to different blocks. Accordingly, power usage by the clock network is reported independently and, therefore, excluded from power usage data reported for any given block of the HLMS for which power usage may be requested.

Figure 3:
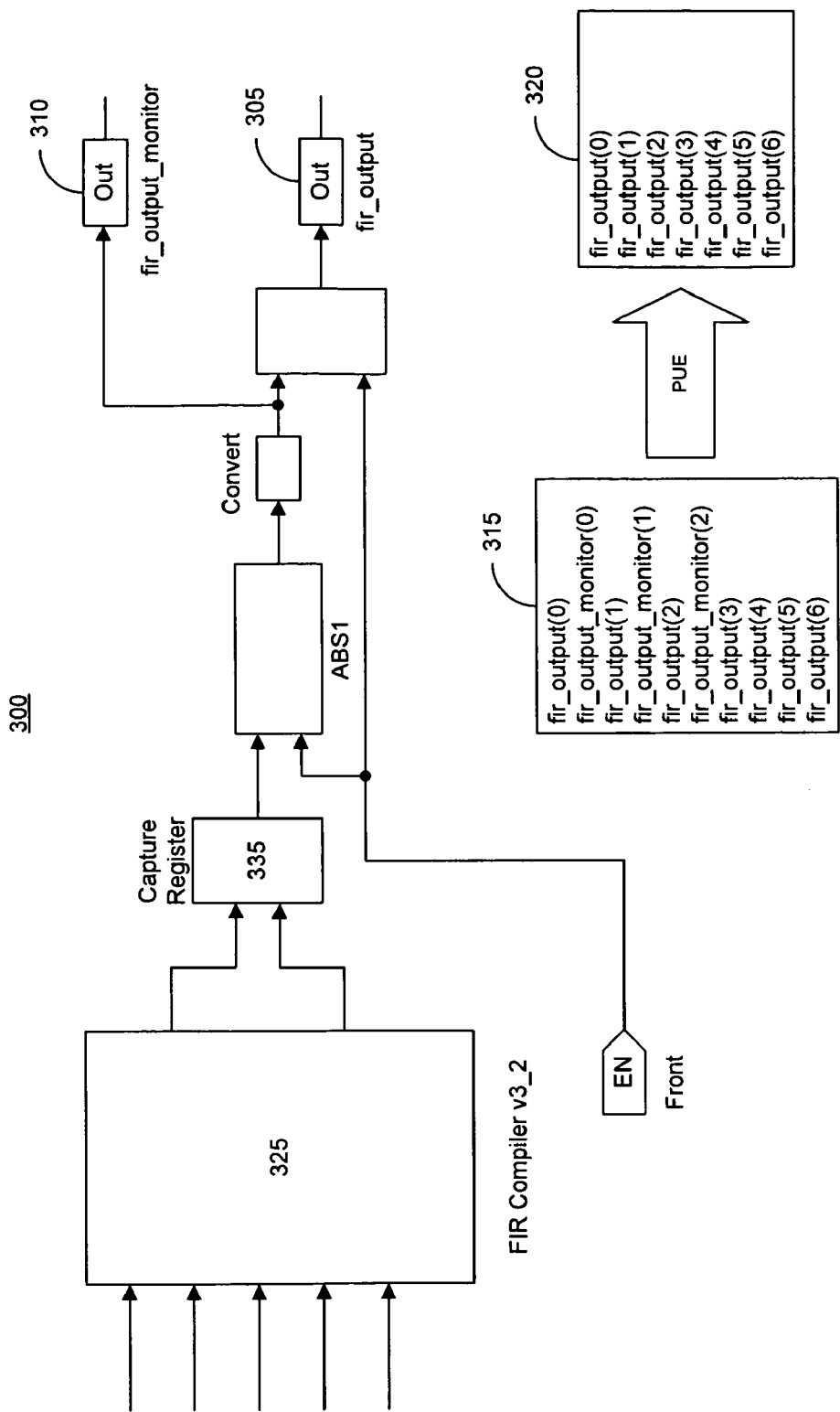
FIG. 3 is a third block diagram of an HLMS circuit design illustrating correlation of low-level circuit elements to blocks in accordance with another embodiment of the present invention.

FIG. 3 is a third block diagram of an HLMS circuit design 300 illustrating correlation of low-level circuit elements to blocks in accordance with another embodiment of the present invention. FIG. 3 illustrates a view of a finite impulse response (FIR) filter that can be implemented within an HLMS. For purpose of illustration, particular details of HLMS circuit design 300 as would be shown within a view of the HLMS have been abstracted away. It should be appreciated that HLMS circuit design 300 is presented for purposes of illustration only and is not intended to limit the embodiments disclosed within this specification to any one particular type of circuit or system.

FIG. 3 provides an example of how various structures such as input and output ports, logic, and signals of HLMS circuit design 300 can be processed. As shown, HLMS circuit design 300 includes an output port 305 which is labeled "fir_output". Within a conventional HLMS, power consumption for top-level input and output ports, e.g., output port 305, may directly correspond to the available blocks within the HLMS. For example, within Sysgen, top-level input and output ports may correspond to "Gateway In" and "Gateway Out" blocks of an HLMS circuit design. With regard to "Gateway In" and "Gateway Out" blocks, no name scrubbing typically occurs. That is, the names of the blocks may be left largely intact within the resulting HDL circuit design. The power usage of a particular Gateway block will be the sum of the power usage of the top-level input and output ports that belong to the Gateway block.

Block 315 represents an example of the power usage data generated for an HDL circuit design generated from HLMS circuit design 300 within a conventional HLMS. In general, within a low-level circuit design, individual output ports of HLMS circuit design 300 will be broken out into their constituent parts. For example, a line within HLMS circuit design 300 that represents a 32-bit output, will be broken out into 32 individual lines, each having a width of a single bit, within the low-level circuit design. The power usage data generated from such low-level circuit designs will be specified in this manner, e.g., a power usage value for each of the 32 individual data lines. Though not shown, information such as average power consumption, capacitance, operational frequency, current flow through the circuit element, and number of loads may be specified for each circuit element.

In the example pictured in FIG. 3, output port 305, also shown as fir_output, has been broken out into top-level ports fir_output(0), fir_output(1), fir_output(2), fir_output(3), fir_output(4), fir_output(5), and fir_output(6) within block 315. Similarly, output port 310, corresponding fir_output_monitor, has been broken out into top-level output ports fir_output_monitor(0), fir_output_monitor(1), and fir_output_monitor(2). The PUE of the HLMS can process the power usage data specified for each of the individual HDL circuit elements shown in block 315 to generate high-level power usage data represented, at least in part, in block 320. Block 320 shows each HDL circuit element that correlates with output port 305. The power usage of each HDL circuit element shown in block 320 can be summed to determine a measure of power usage for output port 305.

Regarding logic, block 325 within HLMS circuit design 300 is labeled "FIR compiler v3_2." Block 335 is labeled "Capture Register". In order to derive a measure of power usage of block 325 and block 335, the PUE can first determine each of the HLD circuit elements that form block 325 and each of the HDL circuit elements that form block 335. This can be performed, as noted, using the name translation data that is generated when HLMS circuit design 300 is converted into an HDL circuit design. For purposes of illustration, block 325 will be renamed "fir_x0/fir_compiler_v3_2" within the HDL circuit design and block 335 will be renamed "fir_x0/capture_register".

Taking block 325 as an example, within any power usage data generated from a netlist, the netlist circuit elements corresponding to HDL circuit element "fir_x0/fir_compiler_v3_2" must be identified. A match approximation technique, as described, can be applied. For each netlist circuit element specified in the netlist power usage data, the HDL circuit element having the smallest distance measure with respect to that netlist circuit element can be determined. As noted, the distance measure can be the LD, sometimes referred to as the "edit distance." In this manner, each netlist circuit element can be mapped to, or correlated with, an HDL circuit element, e.g., one HDL circuit element, that yields the smallest LD distance for that netlist circuit element. Any netlist circuit elements correlated with HDL circuit element "fir_x0/fir_compiler_v3_2" will also be correlated with block 325. Accordingly, any power usage of the netlist circuit elements correlated with HDL circuit element "fir_x0/fir_compiler_v3_2" can be summed and attributed to block 325.

For example, the netlist power usage data will specify, at least in part, the following netlist circuit elements, each with a value measure of power usage, as named below:

fir_x0/fir_compiler_v3_2/comp0.core_instance0/BU2/
U0/g_mac.mac/gen_single_rate.fir/gen_filter_block/
gen_independant_col[0].gen_split_col[0]. gen_taps[1].
gen_calc_norm.calc/
gen_structural.gen_v4_and_v5.gen_ds
p48e.dsp48e_v5 fir_x0/fir_compiler_v3_2/comp0.core_instance0/BU2/
   U0/g_mac.mac/gen_single_rate.fir/gen_filter_block/
   gen_independant_col[0].gen_split_col[0]. gen_taps[2].
   gen_calc_norm.calc/
   gen_structural.gen_v4_and_v5.gen_ds
   p48e.dsp48e_v5 fir_x0/fir_compiler_v3_2/comp0.core_instance0/BU2/
   U0/g_mac.mac/gen_single_rate.fir/gen_filter_block/
   gen_independant_col[0].gen_split_col[0]. gen_taps[3].
   gen_calc_norm.calc/
   gen_structural.gen_v4_and_v5.gen_ds
   p48e.dsp48e_v5

In this example, each netlist circuit element differs only by the parameter ".gen_taps[n]", where n is 1, 2, and 3 in each respective netlist circuit element. Using a distance metric, each of the above names of netlist circuit elements can be correlated with "fir_x0/fir_compiler_v3_2" and, using the name translation data, block 325. Power usage of block 325 can be determined by summing the power usage of each netlist circuit element correlated with block 325.

Regarding signals, the power usage data for netlist circuit design generated from HLMS circuit design 300 can specify power usage for each of the following signals named as below:

fir_x0/capture_register/synth_reg_inst/latency_gt_
   0.fd_array[1].reg_comp/fd_pri    m_array[0].bit_is_
   0.fdre_comp fir_0/fir_compiler_v3_2/LATCH_DATA_OUT/laten-
   cy_gt_0.fd_array[1].reg_com  p/fd_prim_array[0].bi-
   t_is_0.fdre_comp fir_x0/capture_register/synth_reg_inst/latency_gt_
   0.fd_array[1].reg_comp/fd_pri    m_array[1].bit_is_
   0.fdre_comp The PUE can correlate the above names of the above netlist circuit elements, in this case signals, with respective HDL circuit elements again using a distance metric. In this example, each signal corresponds to either block 325 or block 335. Using a distance metric, the above netlist circuit elements with "capture_register" within the name can be correlated with the HDL circuit element "fir_x0/capture_register", which is the HDL circuit element name for block 335. Similarly, the above netlist circuit elements with "fir_x0/fir_compiler_v3_2" within the name will be correlated with the "fir_x0/fir_compiler_v3_2" HDL circuit element and, thus, block 325.

The examples provided with reference to FIG. 3 are provided for purposes of illustration only. While string matching may be used, particularly with regard to the simplified examples shown in FIG. 3, it should be appreciated that the use of a distance metric works in situations where string matching may fail. For example, when the implementation tools modify names in a way that is unknown, a particular string, e.g., a remnant of the original name of a circuit element or block, to search for within the resulting power usage data will also be unknown. A distance metric, however, may still be used to identify those names of circuit elements that are closest to the HDL circuit element names.

As noted, a power usage API can be provided within the HLMS that allows a user to directly query the power usage of a particular block. Responsive to the query, the power usage of the block, as determined using low-level power usage data, can be returned. In one embodiment, the power usage API can support an "xlget_power" command as is available within Matlab, though any of a variety of different commands or syntaxes may be used. In one embodiment, the syntax of the command can be "power=xlget_power(blockHandle)". The block handle used within the HLMS circuit design can be provided as the "blockHandle" argument. In another embodiment, the syntax of the command can be "power=xlget_power(blockPath)", where the block path used within the HLMS circuit design can be specified as the "blockPath" argument.

For example, the commands below can return the power consumption of the 'fir_output' Gateway Out block, e.g., block 305, of HLMS circuit design 300 and the "FIR Compiler v3_2 block, e.g., block 325, of HLMS circuit design 300:

p_fir_output=xlget_power('fir/fir_output');
p_fir_compiler=xlget_power('fir/FIR Compiler v3_2');

Using these commands, one further may be able to invoke, through the power usage API, a find function to find or locate the power usage, e.g., consumption, of any blocks of interest within HLMS circuit design 300.

Figure 4:
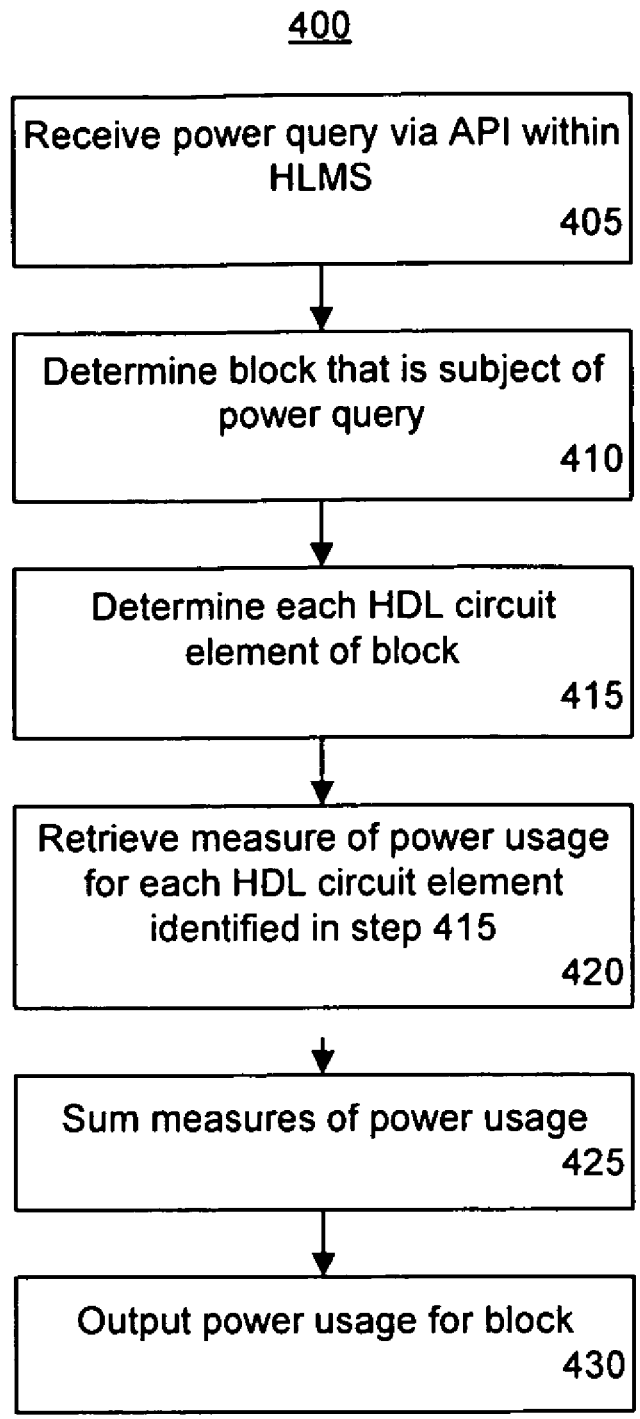
FIG. 4 is a first flow chart illustrating a method of determining power usage for a block of an HLMS circuit design in accordance with another embodiment of the present invention.

FIG. 4 is a first flow chart illustrating a method 400 of determining power usage for a block of an HLMS circuit design in accordance with another embodiment of the present invention. FIG. 4 can be performed using an HLMS as described with reference to FIGS. 1-3 within this specification. Method 400 can begin in a state where the HLMS has transformed an HLMS circuit design, including a plurality of blocks, into an HDL circuit design. The HLSM will have automatically generated an HDL testbench and generated HDL power usage data from performing a simulation upon the HDL circuit design via the testbench. Further, the HLMS will have generated name translation data during the transformation of the HLMS circuit design to the HDL circuit design.

In step 405, a power query can be received from a user via the power usage API of the HLMS. In step 410, the HLMS can determine the particular block that is the subject, or argument, of the query. In step 415, each HDL circuit element that corresponds to the specified block can be identified. As noted, the HDL circuit elements can be identified using the name translation data.

In step 420, a measure of power usage for each HDL circuit element identified in step 415 can be retrieved from the power usage data for the HDL circuit design. The measures of power usage for each HDL circuit element can be specified in terms of average power consumption as determined during the simulation of the HDL circuit design. In step 425, the measures of power usage retrieved for each HDL circuit element correlated with the specified block can be summed. In step 430, the result from the summation performed in step 425 can be output as the power usage for the specified block in response to the received power usage query. Appreciably, in the case of a user querying the HLMS, the power usage can be presented upon a display.

Figure 5:
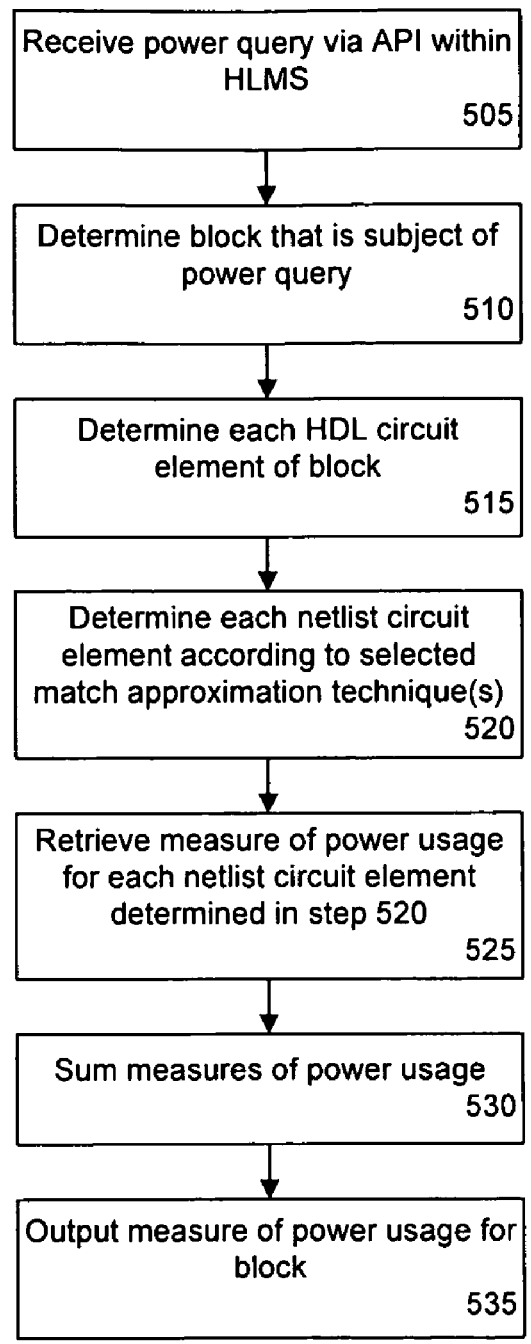
FIG. 5 is a second flow chart illustrating a method of determining power usage for a block of an HLMS circuit design in accordance with another embodiment of the present invention.

FIG. 5 is a second flow chart illustrating a method 500 of determining power usage for a block of an HLMS circuit design in accordance with another embodiment of the present invention. FIG. 5 can be performed using an HLMS as described with reference to FIGS. 1-4 within this specification. Method 500 can begin in a state where the HLMS has transformed an HLMS circuit design, including a plurality of blocks, into an HDL circuit design. In doing so, the HLMS will have also generate name translation data. The HLMS further will have transformed the HDL circuit design into a netlist. The HLMS will have invoked or performed simulation upon the netlist and generated netlist power usage data.

In step 505, a power query can be received from a user via the power usage API of the HLMS. In step 510, the HLMS can determine the particular block that is the subject, or argument, of the query. In step 515, each HDL circuit element of the HDL circuit design that corresponds to the specified block can be determined. As noted, the HDL circuit elements can be identified using the name translation data.

In step 520, each netlist circuit element that corresponds to the HDL circuit elements determined in step 515 can be determined or identified. Netlist circuit elements can be determined using one or more selected match approximation techniques. In step 525, the measure of power usage for each netlist circuit element identified in step 520 can be retrieved. In step 530, the measures of power usage retrieved for the netlist circuit elements can be summed. It should be appreciated that the netlist circuit elements identified in step 520 will be correlated to the specified block by virtue of the established correlations with HDL circuit elements identified in step 515. In step 535, the result from the summation performed in step 530 can be output as the measure of power usage for the specified block in response to the received power usage query.

The embodiments described within this specification provide an automated technique for ascribing low-level power usage data for a circuit design to high-level blocks within an HLMS. Conventional systems output reports that specify power usage data for various circuit elements without any correlation to the high-level blocks used within an HLMS. Often, the relationship between the low-level circuit elements and the high-level blocks formed from the low-level circuit elements is not readily determinable from the power usage reports. The embodiments disclosed herein provide techniques for performing a multi-level analysis that evaluates the transformation of the circuit as specified within an HLMS, through transformation into an HDL representation of the circuit, and further through transformation into a netlist. The power usage API allows a user to directly query for power of a selected block within the HLMS.

It should be appreciated that the processing required to correlate circuit elements to blocks in an HLMS circuit design can be performed responsive to a query or may be performed as power usage data becomes available, as noted. Accordingly, depending upon the particular implementation, when a power query is received, the HLMS may search and retrieve power usage for blocks that has already been calculated and exists within the HLMS or, alternatively, may perform the correlation and summation operations responsive to each respective query.

The flowcharts in the figures illustrate the architecture, functionality, and operation of possible implementations of systems, methods, and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware or in a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, magneto-optical media, computer memory such as random access memory or hard disk(s), or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of estimating power usage for high-level blocks of a high-level modeling system (HLMS) circuit design, the method comprising:

generating a low-level circuit design comprising a plurality of low-level circuit elements from the HLMS circuit design;

simulating the low-level circuit design and storing power usage data, from the simulating, for each of the plurality of low-level circuit elements;

automatically correlating, by a computer, the plurality of low-level circuit elements with the high-level blocks of the HLMS circuit design;

providing a power usage application programming interface (API) configured to receive an identifier of a high-level block as an argument;

receiving a user-specified query for power usage of a selected high-level block of the HLMS circuit design via the power usage API, wherein the query specifies an identifier of the selected high-level block;

wherein the HLMS circuit design is displayed in the form of a plurality of graphical blocks comprising the selected high-level block, wherein each graphical block represents a circuit function;

determining a measure of power usage for the selected high-level block according to the power usage data for selected ones of the plurality of low-level circuit elements correlated with the selected high-level block; and outputting the measure of power usage for the selected high-level block.

2. The computer-implemented method of claim 1, further comprising:

selecting the low-level circuit design to be a hardware description language (HDL) circuit design; and selecting each of the plurality of low-level circuit elements to be an HDL circuit element.

3. The computer-implemented method of claim 2, wherein generating a low-level circuit design comprises generating the HDL circuit design from the HLMS circuit design.

4. The computer-implemented method of claim 3, further comprising generating and storing name translation data mapping the plurality of HDL circuit elements to the high-level blocks of the HLMS circuit design, wherein automatically correlating the plurality of low-level circuit elements with the high-level blocks further comprises associating each of the plurality of low-level circuit elements with one of the high-level blocks according to the name translation data.

5. The computer-implemented method of claim 1, further comprising:

selecting the low-level circuit design to be a netlist; and selecting each of the plurality of low-level circuit elements to be a netlist circuit element.

6. The computer-implemented method of claim 5, wherein generating a low-level circuit design comprises:

generating a hardware description language (HDL) circuit design from the HLMS circuit design, wherein the HDL circuit design comprises a plurality of HDL circuit elements;

generating and storing name translation data mapping the plurality of HDL circuit elements to the high-level blocks of the HLMS circuit design; and generating the netlist from the HDL circuit design.

7. The computer-implemented method of claim 6, wherein automatically correlating the plurality of low-level circuit elements with high-level blocks further comprises:

mapping netlist circuit elements to HDL circuit elements according to a selected match approximation technique; and associating HDL circuit elements with the high-level blocks according to the name translation data.

8. The computer-implemented method of claim 7, wherein mapping netlist circuit elements to HDL circuit elements according to a selected match approximation technique further comprises:

for each HDL circuit element, calculating a distance metric between a name of the HDL circuit element and a name of each of the plurality of netlist circuit elements; and mapping each netlist circuit element to the HDL circuit element with a smallest distance metric.

9. The computer-implemented method of claim 6, wherein automatically correlating the plurality of low-level circuit elements with the high-level blocks further comprises:

determining a component type for each of a plurality of netlist circuit elements of the netlist;

determining a circuit structure to which the plurality of netlist circuit elements map that is available within a programmable integrated circuit in which the HLMS circuit design is to be implemented; and mapping each of the plurality of netlist circuit elements to one of the high-level blocks of the HLMS circuit design that represents the circuit structure available within the programmable integrated circuit.

10. The computer-implemented method of claim 1, wherein the power usage API is provided as part of an HLMS and is configured to return the measure of power usage for the selected high-level block of the HLMS circuit design, as calculated from the power usage data for each of the plurality of low-level circuit elements.

11. A computer-implemented method of estimating power usage for high-level blocks of a high-level modeling system (HLMS) circuit design, the method comprising:

generating a low-level circuit design comprising a plurality of low-level circuit elements from the HLMS circuit design;

simulating the low-level circuit design and storing power usage data, from the simulating, for each of the plurality of low-level circuit elements;

automatically correlating, by a computer, the plurality of low-level circuit elements with the high-level blocks of the HLMS circuit design;

wherein the HLMS circuit design is displayed in the form of a plurality of graphical blocks comprising the selected high-level block, wherein each graphical block represents a circuit function; and outputting high-level power usage data for at least one of the high-level blocks of the HLMS circuit design as calculated from power usage data for selected ones of the plurality of low-level circuit elements correlated with the at least one of the high-level blocks.

12. The computer-implemented method of claim 11, further comprising:

selecting the low-level circuit design to be a hardware description language (HDL) circuit design; and selecting each of the plurality of low-level circuit elements to be an HDL circuit element, wherein generating a low-level circuit design comprises generating the HDL circuit design from the HLMS circuit design.

13. The computer-implemented method of claim 12, further comprising generating and storing name translation data mapping the plurality of HDL circuit elements to high-level blocks of the HLMS circuit design, wherein automatically correlating the plurality of low-level circuit elements comprises assigning each of the plurality of low-level circuit elements to one of the high-level blocks according to the name translation data.

14. The computer-implemented method of claim 11, further comprising:

selecting the low-level circuit design to be a netlist; and selecting each of the plurality of low-level circuit elements to be a netlist circuit element, wherein generating a low-level circuit design comprises generating a hardware description language (HDL) circuit design from the HLMS circuit design, wherein the HDL circuit design comprises a plurality of HDL circuit elements, generating and storing name translation data mapping the plurality of HDL circuit elements to the high-level blocks of the HLMS circuit design, and generating a netlist from the HDL circuit design.

15. The computer-implemented method of claim 14, wherein automatically correlating each of the plurality of low-level circuit elements further comprises:
   mapping netlist circuit elements to HDL circuit elements according to a selected match approximation technique; and
   mapping HDL circuit elements to the high-level blocks according to the name translation data.

16. The computer-implemented method of claim 11, further comprising, responsive to receiving a user query for power usage of a selected high-level block of the HLMS circuit design, outputting a measure of power usage for the selected high-level block as calculated from the power usage data for selected ones of the low-level circuit elements correlated with the selected high-level block.

17. A computer program product comprising:
   a non-transitory computer-usable medium comprising computer-usable program code that, when executed by a computer, estimates power usage for at least one high-level block of a high-level modeling system (HLMS) circuit design, the computer-usable medium comprising:
   computer-usable program code that generates a low-level circuit design comprising a plurality of low-level circuit elements from the HLMS circuit design;
   computer-usable program code that simulates the low-level circuit design and stores power usage data, from simulation, for each of the plurality of low-level circuit elements;
   computer-usable program code that automatically correlates the plurality of low-level circuit elements with high-level blocks of the HLMS circuit design;
   computer-usable program code that determines a measure of power usage for a selected high-level block according to the power usage data for selected ones of the plurality of low-level circuit elements correlated with the selected high-level block;
   computer-usable program code that displays the HLMS circuit design in the form of a plurality of graphical blocks comprising the selected high-level block, wherein each graphical block represents a circuit function; and
   computer-usable program code that outputs the measure of power usage for the selected high-level block.

18. The computer program product of claim 17, wherein the low-level circuit design is a hardware description language (HDL) circuit design and each of the plurality of low-level circuit elements is an HDL circuit element, wherein the computer-usable medium further comprises:
   computer-usable program code that generates and stores name translation data specifying a mapping of the plurality of HDL circuit elements to the high-level blocks of the HLMS circuit design; and
   computer-usable program code that automatically determines which ones of the plurality of HDL circuit elements are part of the selected high-level block according to the name translation data.

19. The computer-implemented method of claim 17, wherein the low-level circuit design is a netlist and each of the plurality of low-level circuit elements is a netlist circuit element, wherein the computer-usable medium further comprises:
   computer-usable program code that transforms the HLMS circuit design into a hardware description language (HDL) circuit design, wherein the HDL circuit design comprises a plurality of HDL circuit elements mapped to high-level blocks through stored name translation data;
   computer-usable program code that generates a netlist from the HDL circuit design, wherein the netlist comprises a plurality of netlist circuit elements;
   computer-usable program code that maps the plurality of netlist circuit elements to the plurality of HDL circuit elements according to a selected match approximation technique; and
   computer-usable program code that assigns selected ones of the plurality of HDL circuit elements to the selected high-level block according to the name translation data.

20. The computer program product of claim 17, wherein the computer-usable medium further comprises computer-usable program code that, responsive to a user query for power usage of the selected high-level block of the HLMS circuit design, outputs the measure of power usage for the selected high-level block of the HLMS circuit design calculated from low-level power usage data.

* * * * *